United States Patent [19]
Ansley

[11] Patent Number: 5,319,490
[45] Date of Patent: Jun. 7, 1994

[54] HELMET MOUNTED DISPLAY INCLUDING SYNCHRONOUSLY MOVING TILTED MECHANISMS

[75] Inventor: David A. Ansley, Long Beach, Calif.

[73] Assignee: Hughes Training, Inc., Arlington, Tex.

[21] Appl. No.: 946,510

[22] Filed: Sep. 16, 1992

[51] Int. Cl.$^5$ .................... G02B 26/10; G02B 27/10
[52] U.S. Cl. .................... 359/209; 359/203; 359/630; 385/116
[58] Field of Search ............... 359/203, 209, 630, 631; 385/116

[56] References Cited

U.S. PATENT DOCUMENTS

| | | |
|---|---|---|
| 3,603,665 | 9/1971 | Goldmark et al. |
| 4,105,336 | 8/1978 | Pond .................... 359/629 |
| 4,141,624 | 2/1979 | Siegmund .................... 385/116 |
| 4,500,204 | 2/1985 | Ogura . |
| 4,534,615 | 8/1985 | Iwasaki .................... 359/209 |
| 5,006,201 | 4/1991 | Kaukeinen . |

FOREIGN PATENT DOCUMENTS

| | | | |
|---|---|---|---|
| 0202987 | 4/1986 | European Pat. Off. ...... G02B 27/00 |
| 1581926 | 2/1976 | United Kingdom ......... G02B 23/10 |
| 1546827 | 7/1976 | United Kingdom ......... G02B 27/17 |
| 2009959 | 5/1978 | United Kingdom .......... G02B 5/17 |
| 2013924 | 1/1979 | United Kingdom .......... G02B 5/14 |
| 2081923 | 6/1981 | United Kingdom ......... G02B 27/00 |

Primary Examiner—Jon W. Henry
Attorney, Agent, or Firm—Wanda K. Denson-Low

[57] ABSTRACT

An improved helmet mounted display. The inventive display includes a laser and a fiber optic cable having an array having two sets of rows of optical fibers and being mounted to receive input from said laser at a input end and to illuminate a screen with light from said laser via an output end thereof. A particularly novel aspect of the invention is the provision of a first mechanism at the input end of the fiber optic cable for illuminating a first set of rows of fibers in the array with light from the laser during a first scanning interval and for illuminating a second set of rows of fibers in the array with light from the laser during a second scanning interval. A second tilting mechanism is mounted at the output end of the fiber optic cable for directing illumination from the first set of rows of fibers in the array to a screen during the first scanning interval and for directing illumination from the second set of rows of fibers in the array to the screen during the second scanning interval. An actuator is provided for moving the first and second tilting mechanisms synchronously. In a specific implementation, the first and second tilting mechanisms are glass plates and the actuator is a piezo-electric transducer. By repeating a scan over a second set of fibers, the visibility of dead spots in the output image from broken fibers is mitigated.

20 Claims, 5 Drawing Sheets

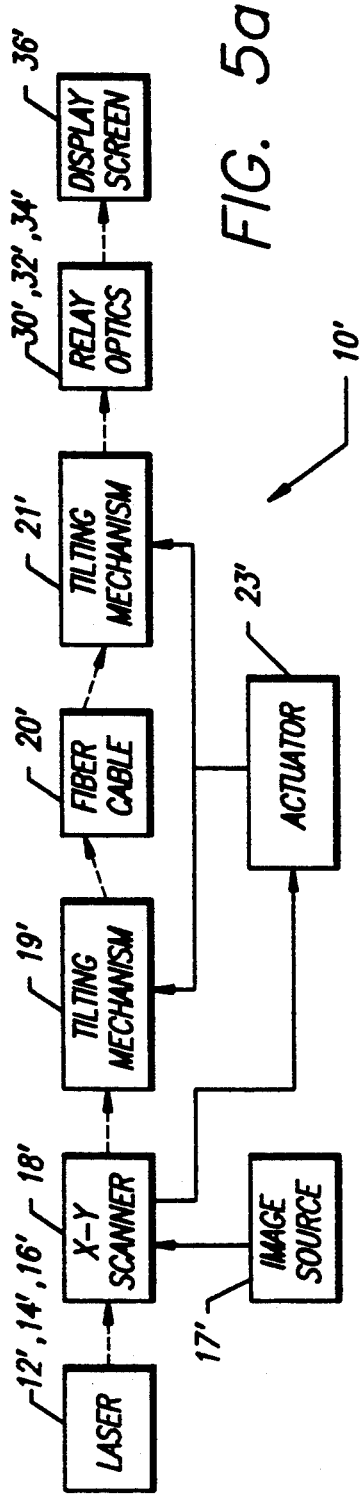
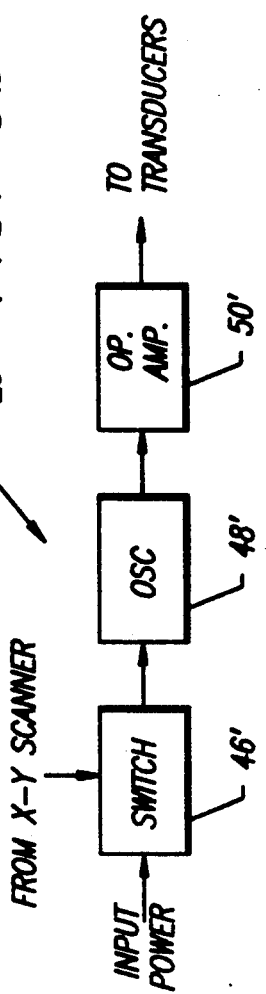
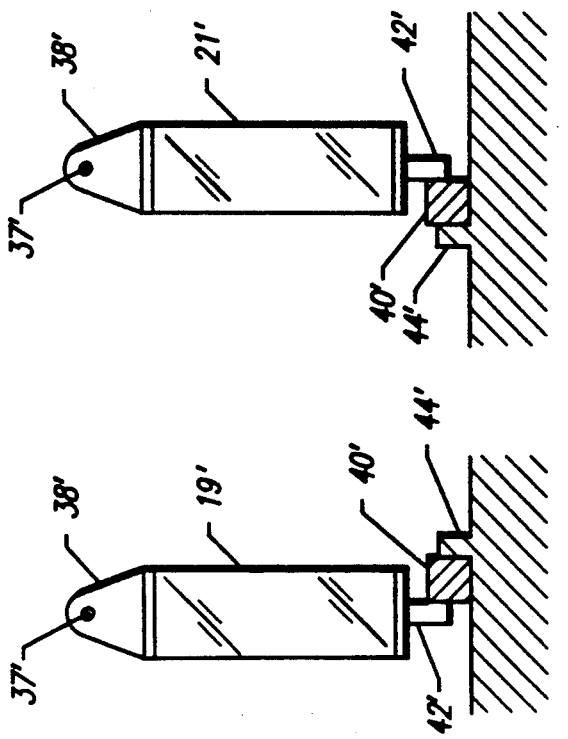
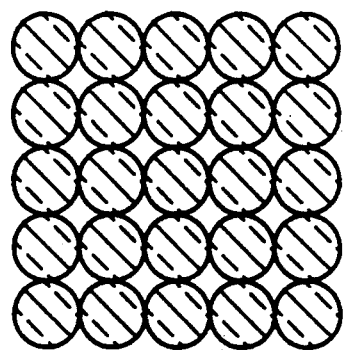

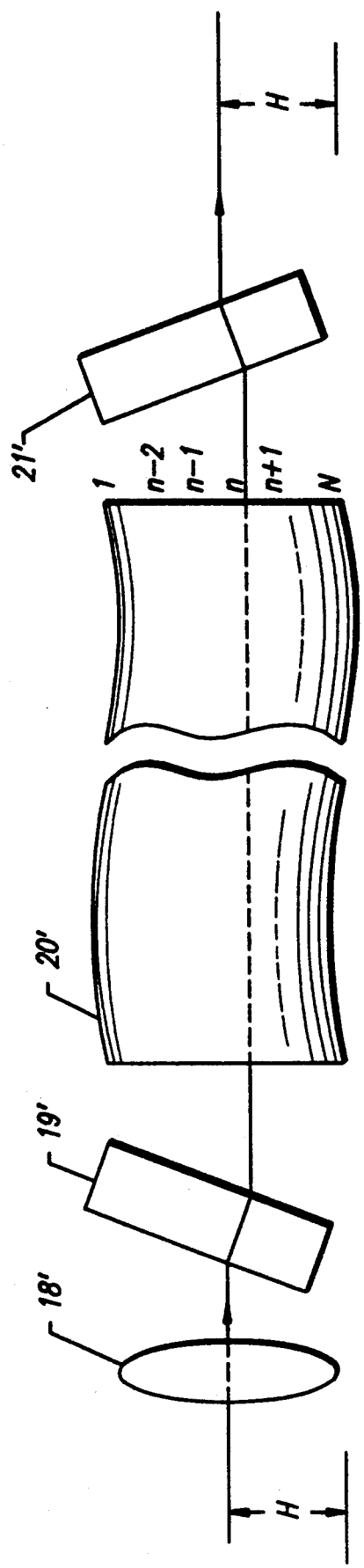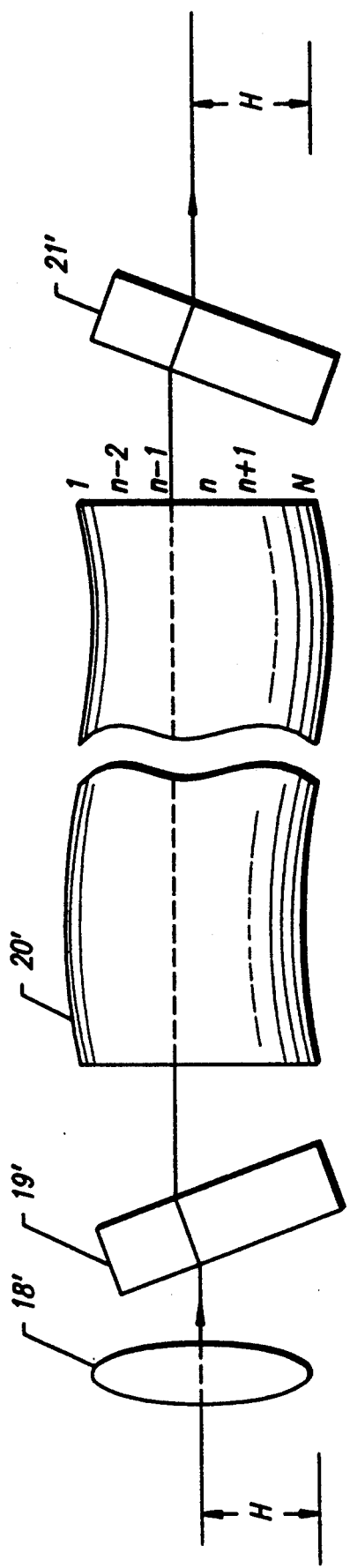

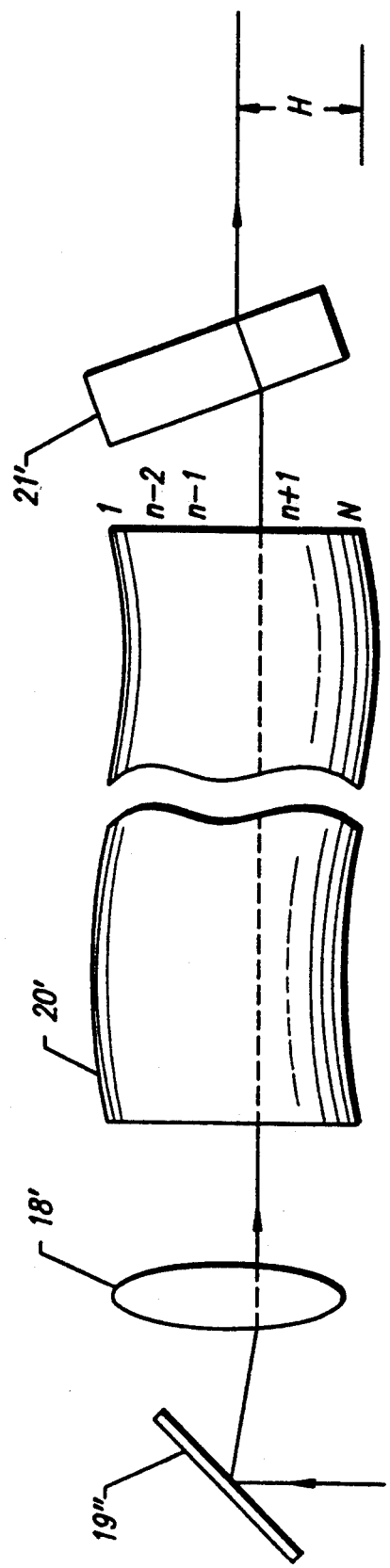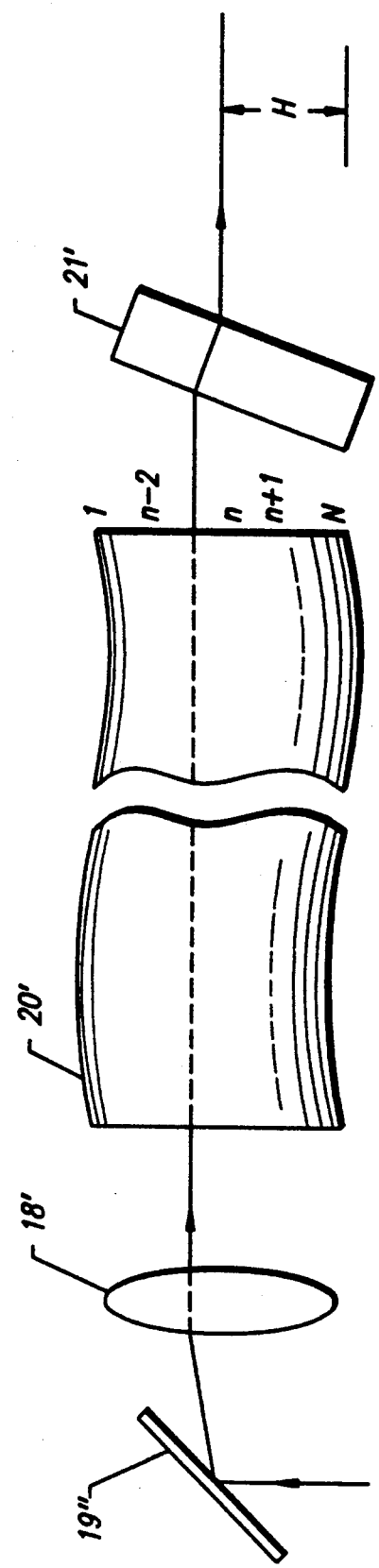

HELMET MOUNTED DISPLAY INCLUDING SYNCHRONOUSLY MOVING TILTED MECHANISMS

BACKGROUND OF THE INVENTION

1. Field of the Invention

The present invention relates to display systems. More specifically, the present invention relates to helmet mounted displays.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

Helmet mounted displays are useful in simulator, entertainment and virtual reality applications. Helmet mounted displays include a projector which provides an image on a screen or window which is attached to a helmet. As the head of the wearer moves, the displays moves and maintains an image in the field of view of the wearer. In displays in which the projector is bulky and heavy, the projector is mounted off the helmet and the image is relayed to the screen by a fiber optic cable and relay optics. To recreate the image with acceptable resolution, the fiber optic cable includes a large number of individual fibers which are often arranged into 5 by 5 arrays or multifibers.

Unfortunately, it is common for several multifibers to break creating dead spots in the display obscuring the displayed image.

One prior approach to this problem involves the use of a prism at the input end of the image guide to spread the color spectrum of the image over many fibers. An identical prism installed at the output end served to recombine the color spectrum into a single image. Unfortunately, this approach would not work in laser based projectors because the primary colors are single wavelengths. As there is no broad color spectrum with these systems, all energy for each color would pass through a single fiber only.

Another approach involves the use of tilted flat glass plate, one at the input and one at the output end. The plates are spun synchronously to spread the image in a circular pattern over many fibers. This approach would also be ineffective with laser projectors as laser light has zero persistence. Every point in the image is illuminated for just an instant. The stroboscopic effect of the scanning laser beam is such that the illumination of each point passes only through a single fiber.

Hence, these incoherent techniques for minimizing the effect of dead fibers in fiber optic image guides do not adequately address the problem of dead fibers in the otherwise advantageous laser projector.

Accordingly, there is a need in the art for a technique for correcting for dead spots projected images resulting from broken fibers in laser projector based helmet mounted displays.

SUMMARY OF THE INVENTION

The need in the art is addressed by the present invention which provides an improved helmet mounted display. The inventive display includes a laser and a transmission medium, e.g., a fiber optic cable, having an array having two sets of rows of optical elements (fibers) and being mounted to receive input from said laser at a input end and to illuminate a screen with light from said laser via an output end thereof. A particularly novel aspect of the invention is the provision of a first tilting mechanism at the input end of the fiber optic cable for illuminating a first set of rows of fibers in the array with light from the laser during a first scanning interval and for illuminating a second set of rows of fibers in the array with light from the laser during a second scanning interval. A second tilting mechanism is mounted at the output end of the fiber optic cable for directing illumination from the first set of rows of fibers in the array to a screen during the first scanning interval and for directing illumination from the second set of rows of fibers in the array to the screen during the second scanning interval. An actuator is provided for moving the first and second tilting mechanisms synchronously. In a specific implementation, the first and second tilting mechanisms are glass plates and the actuator is a piezo-electric transducer. By repeating a scan over a second set of fibers, the visibility of dead spots in the output image from broken fibers is mitigated.

BRIEF DESCRIPTION OF THE DRAWINGS

FIG. 3 depicts a 5 by 5 array of fibers constituting a multifiber.

FIGS. 4a and 4b are diagrams depicting the advantageous operation of the improved helmet display system of the present invention.

FIG. 5a is a block diagram of the improved laser projector based helmet mounted display system of the present invention.

FIG. 5b is a block diagram of the actuator of the improved laser projector based helmet mounted display system of the present invention.

FIGS. 6a and 6b depict illustrative implementations of the tilting mechanisms of the present invention.

FIGS. 7a and 7b are diagrams depicting the advantageous operation of an alternative embodiment of the improved helmet display system of the present invention.

DESCRIPTION OF THE INVENTION

Illustrative embodiments and exemplary applications will now be described with reference to the accompanying drawings to disclose the advantageous teachings of the present invention.

Figure 1:
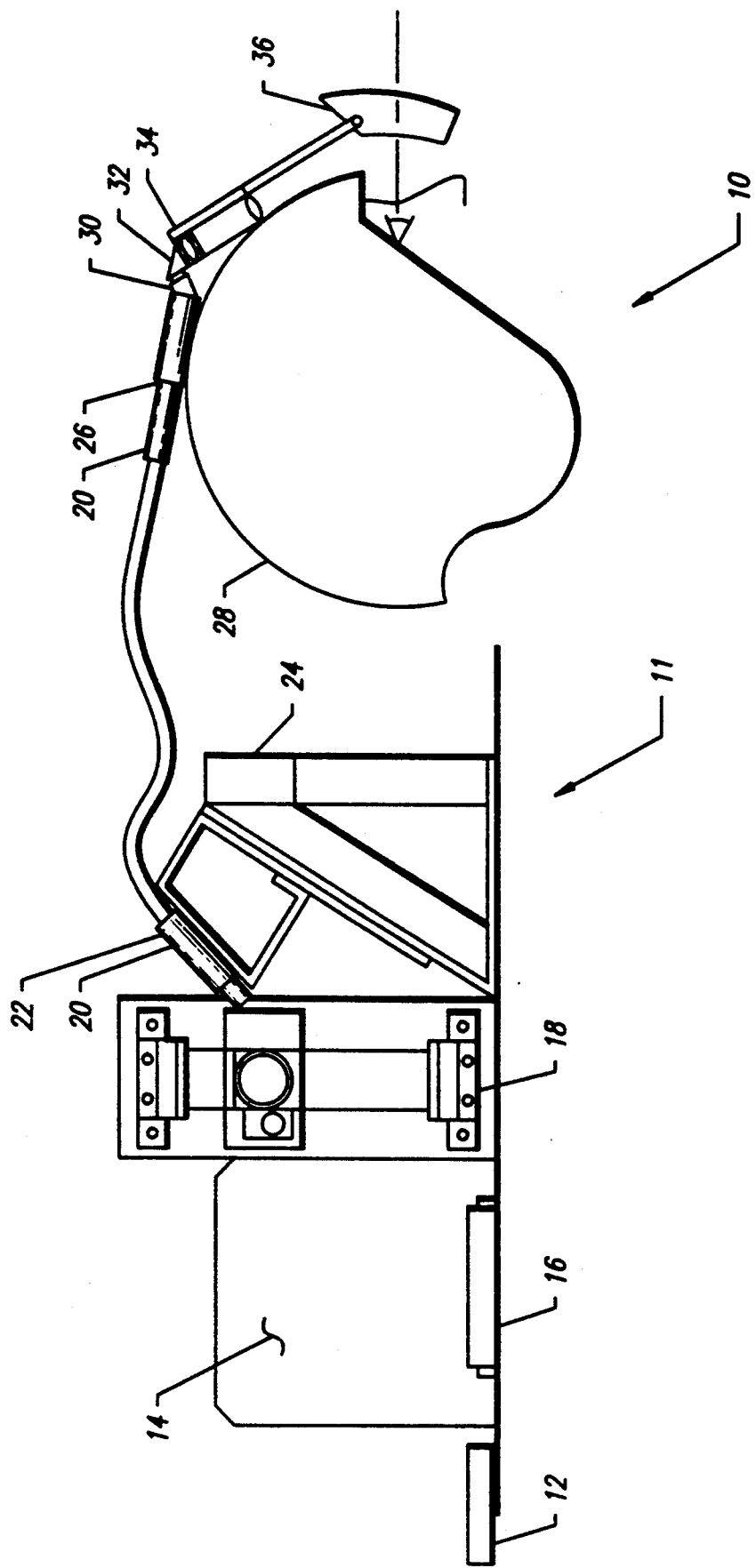
FIG. 1 is a block diagram of a conventional helmet mounted display system.

FIG. 1 is a block diagram of a conventional helmet mounted display system. The system 10 includes a projector assembly 11 on which an argon-ion laser 12 is mounted. The argon-ion laser 12 provides a blue-green beam to color modulation optics 14. The color modulation optics separate the blue-green beam into a blue beam, a green beam and a pump beam in a conventional manner. The pump beam is used to excite a red dye laser 16. The red dye laser outputs a red beam which is combined with the blue and green beams by the color modulation optics in accordance with input image data from a source (not shown) by an x-y scanner 18. The x-y scanner 18 is typically a polygon-galvo assembly. The scanner 18 sweeps the beams in two orthogonal directions to form a rectilinear image and focuses the image in the three beams onto the input end of a fiber optic image guide. The fiber optic image guide includes a bundle of optical fibers bound together to form a cable 20. The first end 22 of the fiber optic cable 20 is secured to the frame 24 of the projector assembly 11. The second end 26 of the cable 20 is secured to a helmet 28 along with a fiber optic faceplate 30, a fold prism 32, a relay lens 34 and a plastic visor combining element or screen 36. The image output by the cable appears at the output end 26 of the cable 20. The fiber optic faceplate 30 transfers the image from the flat end of the cable to the curved second surface of the fiber optic faceplate as is known in the art. The curved image simplifies the design of the relay lens assembly. The fold prism 32 bends the optical path and allows the helmet mounted display to conform more closely to the contour of the helmet. The relay lens assembly directs the light from the image onto the plastic visor/combining element or screen 36. The combining element 36 collimates the light and reflects it toward the pilot's eyes.

Figure 2A:
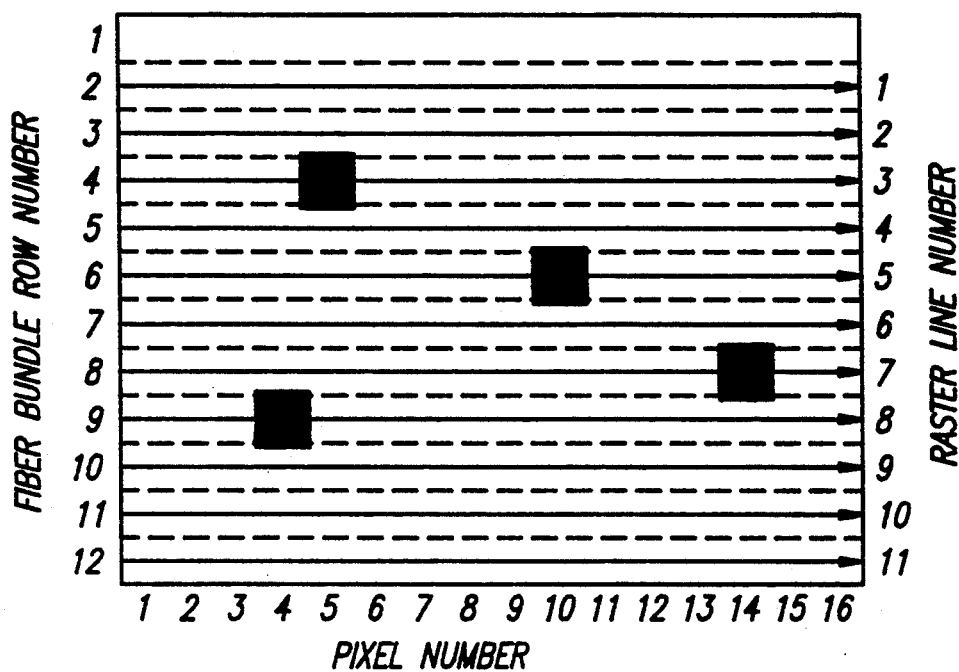
FIGS. 2a and 2b show a cross-sectional end view of a fiber optic image guide with four dead spots resulting from four broken multifibers.
Figure 2B:
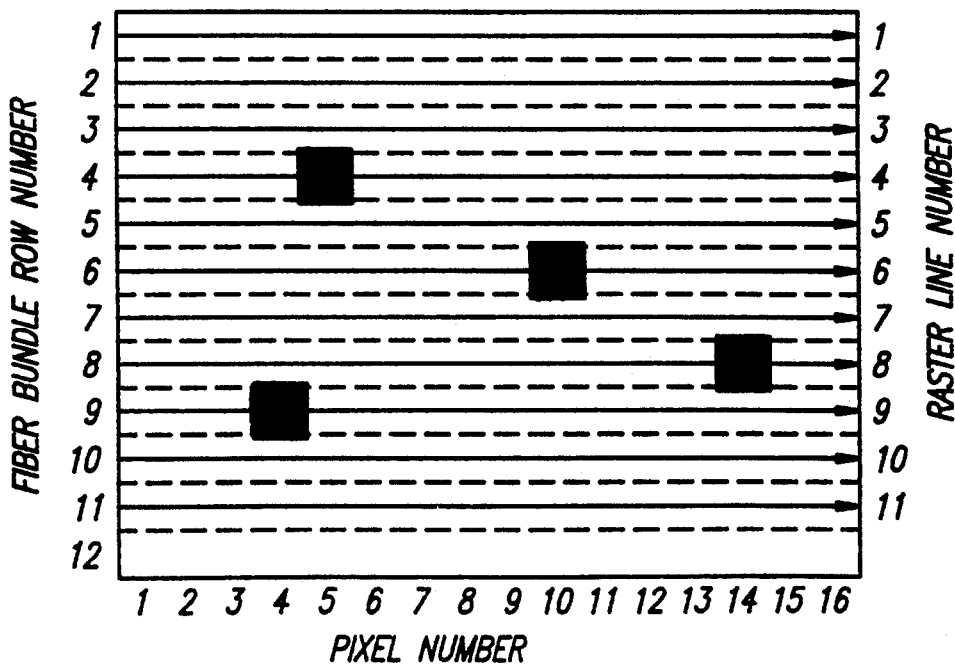

As mentioned above, the frequent movement of the pilot's head induces stress in the fiber optic cable 20 which causes breakage of some of the fibers therein. Frequently an entire multifiber breaks creating a substantial undesirable dead spot in the displayed image. FIGS. 2a and 2b show a cross-sectional end view of a fiber optic image guide with four dead spots resulting from four broken multifibers. The term "multifiber" refers to the construction of a fiber optic image guide whereby approximately 25 fibers are assembled together into an array. FIG. 3 depicts a 5 by 5 array of fibers constituting a multifiber. In a typical helmet mounted display, 0.2% of the multifibers are broken. For a typical 12×21 mm image guide with 10 micron fiber diameters, there will be as many as 200 dead multifibers.

FIGS. 2a and 2b illustrate how the image is time sequentially transmitted through different parts of the fiber optic cable 20. FIG. 2a shows the position of the television raster lines by line number for even numbered television frames. (In this context, "television frame" refers to one complete set of television raster lines from the top to the bottom of the display.) For example, raster line no. 3 is aligned with fiber bundle row number 4. FIG. 2b shows the position of the television raster lines by line number for odd number television frames. Now, raster line no. 3 is aligned with fiber bundle row number 3. Thus, for even TV frames, TV raster line 3, pixel number 5 is obscured by a broken multifiber. However, for odd TV frames, TV raster line 3, pixel number 5 is not obscured. Therefore, if the intensity of odd TV frame raster line 3, pixel number 5 is twice normal, then the time averaged intensity of raster line 3, pixel number 5 is normal. In other words, the visibility of the broken multifiber is diminished.

The preferred method for increasing the intensity of each selected pixel is to briefly increase the output power of the laser projector as the selected pixel is displayed. The locations of the broken fibers are stored in memory. When the instantaneous display address corresponds to the address (location) of a defect, the laser projector power is briefly increased.

In any event, without some type of compensating mechanism, the pilot would see an image that rapidly jumps up and down by one raster line every time the TV frame number changes from even to odd and vice versa.

FIGS. 4a and 4b are diagrams depicting the advantageous operation of the improved helmet display system of the present invention. FIGS. 4a and 4b show one method for eliminating the jumping effect, in accordance with the present teachings. One tilted glass plate 19' is mounted adjacent the input end of the fiber optic cable and a second tilted glass plate 21' is mounted adjacent to the output end of the cable 20'. The angle of tilt is identical for both plates. The x-y scanner 18' shown generally as a focusing lens.

As shown in FIG. 4a, raster line "r" passes through fiber optic bundle row "n". The image height "H" is the same on either side of the image guide. After completing the even TV frame and before commencing to display the odd TV frame (a time period of approximately 1.5 milliseconds typically), the tilt angle of both plates is reversed as shown in FIG. 4b. After changing the tilt angles, raster line "r" passes through fiber optic bundle row "n−1". Note that the image height "H" is still the same. Thus, the pilot sees a stable image with no jumping.

FIG. 5a is a block diagram of the improved laser projector based helmet mounted display system 10' of the present invention. The system is essentially the same as that of FIG. 1 with the exception of the advantageous tilting mechanisms 19' and 21' mounted at the input and output ends, respectively, of the fiber optic cable 20' and an associated actuator 23'. Here, the number of fibers is increased by one row.

The tilting mechanisms 19' and 21', implemented with the glass plates mentioned above are shown in FIGS. 6a and 6b. Each mechanism includes a glass plate mounted in a retaining ring 38'. The plates may be constructed of optical grade glass such as Schott BK-7 or other suitable material. In the illustrative embodiment, the plates are constructed of Schott BK-7 of 2 millimeter thickness.

The retaining ring 38' is adapted for pivotal movement about a hinge 37' at the upper end thereof. In the illustrative embodiment, the plate is tilted by a piezoelectric transducer 40'. The piezo-electric transducer is sandwiched between an extension 42' from the retaining ring 38' and an extension 44' from a rigid, stationary housing or frame (not shown). In the illustrative embodiment, the piezo-electric transducers 40' were chosen to provide a tilt angle of ±2.1 degrees for an image displacement on the cable of 50 microns. The piezo-electric transducers 40' are activated by signals supplied by the actuator circuit 23' of FIG. 5.

As shown in FIG. 5b, the actuator 23' receives a timing and activation signal from the x-y scanner 18'. This signal is used to switch power from a switch 46' to an oscillator 48'. The output of the oscillator 48' is input to an operational amplifier 50' where it is amplified prior to being output to the transducers 40'.

FIGS. 7a and 7b are diagrams depicting the advantageous operation of an alternative embodiment of the improved helmet display system of the present invention. In the embodiment of FIGS. 7a and 7b, the function of the first tilting plate 19' is provided by a scanning mirror 19'' mounted within the x-y scanner 18'. For a laser projector the position of the raster lines on the input end of the fiber optic cable is usually controlled by a scanning mirror that is mounted on the shaft of a galvanometer. By changing the electrical drive signal to the galvanometer, raster line "r" can be imaged onto fiber optic bundle row "n" during the even TV frame as shown in FIG. 7a. Similarly, during the odd TV frame, raster line "r" can be imaged onto fiber optic bundle row "n −1".

Thus, the operation is seen to be essentially the same as that of the first embodiment of FIGS. 4a and 4b. That is, the raster line "r" passes through fiber optic bundle row "n". The image height "H" is the same on either side of the image guide. After completing the even TV frame and before commencing to display the odd TV frame, the tilt angles of the mirror 19" and the plate 21' are reversed as shown in FIG. 7b. After changing the tilt angle, raster line "r" passes through fiber optic bundle row "n −1".

The present invention has been described herein with reference to a particular embodiment for a particular application. Those having ordinary skill in the art and access to the present teachings will recognize additional modifications applications and embodiments within the scope thereof. For example, the invention is not limited to the implementations show for effecting tilt and for actuating the tilting mechanism. In addition, the invention is not limited to use with fiber optic bundles.

It is therefore intended by the appended claims to cover any and all such applications, modifications and embodiments within the scope of the present invention.

Accordingly,

What is claimed is:

1. An improved helmet mounted display comprising:
a laser;
a scanning means for scanning a light beam from said laser to form an image;
a transmission medium including an array having two sets of rows of optical elements and being mounted to receive input from said scanning means at an input end and to illuminate a screen with light from said laser via an output end thereof;
first tilting means mounted at the input end of said transmission medium for illuminating a first set of rows of said elements in said array with laser light from said scanning means during a first scanning interval and for illuminating a second set of rows of elements in said array with laser light from said scanning means during a second scanning interval, said second set of rows being disposed between said first set of rows;
second tilting means mounted at the output end of said transmission medium for directing illumination from said first set of rows of elements in said array to a screen during said first scanning interval and for directing illumination from said second set of rows of elements in said array to said screen during said second scanning interval; and
means for synchronously actuating said first and second tilting means so that said first and second tilting means are fixed in position at respective first scanning interval tilting angles during said first scanning interval, and said first and second tilting means are actuated to respective fixed second scanning interval tilting angles during said second scanning interval.

2. The invention of claim 1 wherein said first tilting means includes a glass plate.

3. The invention of claim 2 wherein said second tilting means includes a glass plate.

4. The invention of claim 3 wherein said means for synchronously actuating said first and second tilting means includes a piezoelectric transducer.

5. The invention of claim 1 wherein said first tilting means includes a mirror.

6. The invention of claim 5 wherein said second tilting means includes a glass plate.

7. The invention of claim 6 wherein said means for synchronously actuating said second tilting means includes a piezoelectric transducer.

8. An improved helmet mounted display comprising:
a laser;
a scanning means for scanning a light beam from said laser to form an image;
a fiber optic cable having an array having two sets of rows of optical fibers and being mounted to receive input from said scanning means at an input end and to illuminate a screen with light from said laser via an output end thereof;
first tilting means mounted at the input end of said fiber optic cable for illuminating a first set of rows of fibers in said array with laser light from said scanning means during a first scanning interval and for illuminating a second set of rows of fibers in said array with laser light from said scanning means during a second scanning interval, said second set of rows being disposed between said first set of rows;
second tilting means mounted at the output end of said fiber optic cable for directing illumination from said first set of rows of fibers in said array to a screen during said first scanning interval and for directing illumination from said second set of rows of fibers in said array to said screen during said second scanning interval; and
means for synchronously actuating said first and second tilting means so that said first and second tilting means are fixed in position at respective first scanning interval tilting angles during said first scanning interval, and said first and second tilting means are actuated to respective fixed second scanning interval tilting angles during said second scanning interval.

9. The invention of claim 8 wherein said first tilting means includes a glass plate.

10. The invention of claim 9 wherein said second tilting means includes a glass plate.

11. The invention of claim 10 wherein said means for synchronously actuating said first and second tilting means includes a piezoelectric transducer.

12. The invention of claim 8 wherein said first tilting means includes a mirror.

13. The invention of claim 12 wherein said second tilting means includes a glass plate.

14. The invention of claim 13 wherein said means for synchronously actuating said second tilting means includes a piezoelectric transducer.

15. The invention of claim 1 wherein said scanning means scans said light beam to form a raster-scanned image focussed on said input end of said transmission medium, said image formed by alternating even and odd television frames of rows of raster lines.

16. The invention of claim 15 wherein said actuating means is actuated to change between said first and second scanning interval tilting angles during a time interval when said scanning means reset upon completing said even frame and before commencing to display said odd television frame.

17. The invention of claim 15 further comprising means for selectively modulating the intensity of laser light from said laser during one of said even or odd frames to increase the intensity of pixels obscured by defects in particular ones of said optical elements during the other of said even or odd frames, to obtain a time averaged intensity of image pixels for pixels obscured by said optical element defects which is substantially the same as the time averaged intensity of image pixels for pixels not obscured by optical element defects.

18. The invention of claim 8 wherein said scanning means scans said light beam to form a raster-scanned image focussed on said input end of said transmission medium, said image formed by alternating even and odd television frames of rows of raster lines.

19. The invention of claim 18 wherein said actuating means is actuated to change between said first and second scanning interval tilting angles during a time interval when said scanning means resets upon completing said even frame and before commencing to display said odd television frame.

20. The invention of claim 18 further comprising means for selectively modulating the intensity of laser light from said laser during one of said even or odd frames to increase the intensity of pixels obscured by broken optical fibers during the other of said even or odd frames, to obtain a time averaged intensity of image pixels for pixels obscured by said broken fibers which is substantially the same as the time averaged intensity of image pixels for pixels not obscured by broken fibers.

* * * * *